United States Patent
Ferriss et al.

[11] Patent Number: 5,820,225
[45] Date of Patent: Oct. 13, 1998

[54] VEHICLE WHEEL ASSEMBLY AND METHOD OF MAKING SAME

[75] Inventors: David Ferriss, Novi; William K. Pope, Lapeer; Ted E. Eikhoff, Grosse Pointe, all of Mich.

[73] Assignee: McKechnie Vehicle Components (USA), Inc., Troy, Mich.

[21] Appl. No.: 739,035

[22] Filed: Oct. 28, 1996

[51] Int. Cl.⁶ .................................................... B60B 7/06
[52] U.S. Cl. .................. 301/37.1; 301/37.37; 301/37.43
[58] Field of Search ................................ 301/37.1, 37.24, 301/37.27, 37.42, 37.43, 108.1, 108.3, 37.26, 108.2; 29/894.38, 894.381

[56] References Cited

U.S. PATENT DOCUMENTS

| Re. 35,497 | 4/1997 | Carter, III .......................... 301/37.43 |
|---|---|---|
| 3,062,254 | 11/1962 | Keefe . |
| 3,517,968 | 6/1970 | Tully et al. ........................ 301/37.24 |
| 3,669,501 | 6/1972 | Derleth . |
| 3,762,677 | 10/1973 | Adams . |
| 3,860,295 | 1/1975 | Beisch ............................... 301/108.2 X |
| 3,918,762 | 11/1975 | Hampshire . |
| 3,968,996 | 7/1976 | Wilcox . |
| 4,067,621 | 1/1978 | Reppert ............................... 301/108.3 |
| 4,295,685 | 10/1981 | Spisak ................................ 301/37.42 |
| 4,344,654 | 8/1982 | Apezynski ..................... 301/37.42 X |
| 4,427,238 | 1/1984 | Connell .......................... 301/37.24 X |
| 4,836,615 | 6/1989 | Berg et al. . |
| 5,031,966 | 7/1991 | Oakey ............................. 301/37.43 X |
| 5,128,085 | 7/1992 | Post et al. . |
| 5,131,727 | 7/1992 | Johnson . |
| 5,294,189 | 3/1994 | Price et al. . |
| 5,368,370 | 11/1994 | Beam . |
| 5,380,103 | 1/1995 | Lederman . |
| 5,458,401 | 10/1995 | Baccman . |

FOREIGN PATENT DOCUMENTS 63-3275401   11/1988   Japan ................................. 301/37.42

*Primary Examiner*—Russell D. Stormer
*Attorney, Agent, or Firm*—Bliss McGlynn, P.C.

[57] ABSTRACT

A wheel assembly (10) includes an applique (40) of sheet material adhered to a molded insert member (50) of structural rigidity. The insert member (50) is molded to change the depth and contour of the wheel face from the original steel wheel (12). The insert member (50) is adhered and/or locked to the steel wheel.

24 Claims, 4 Drawing Sheets

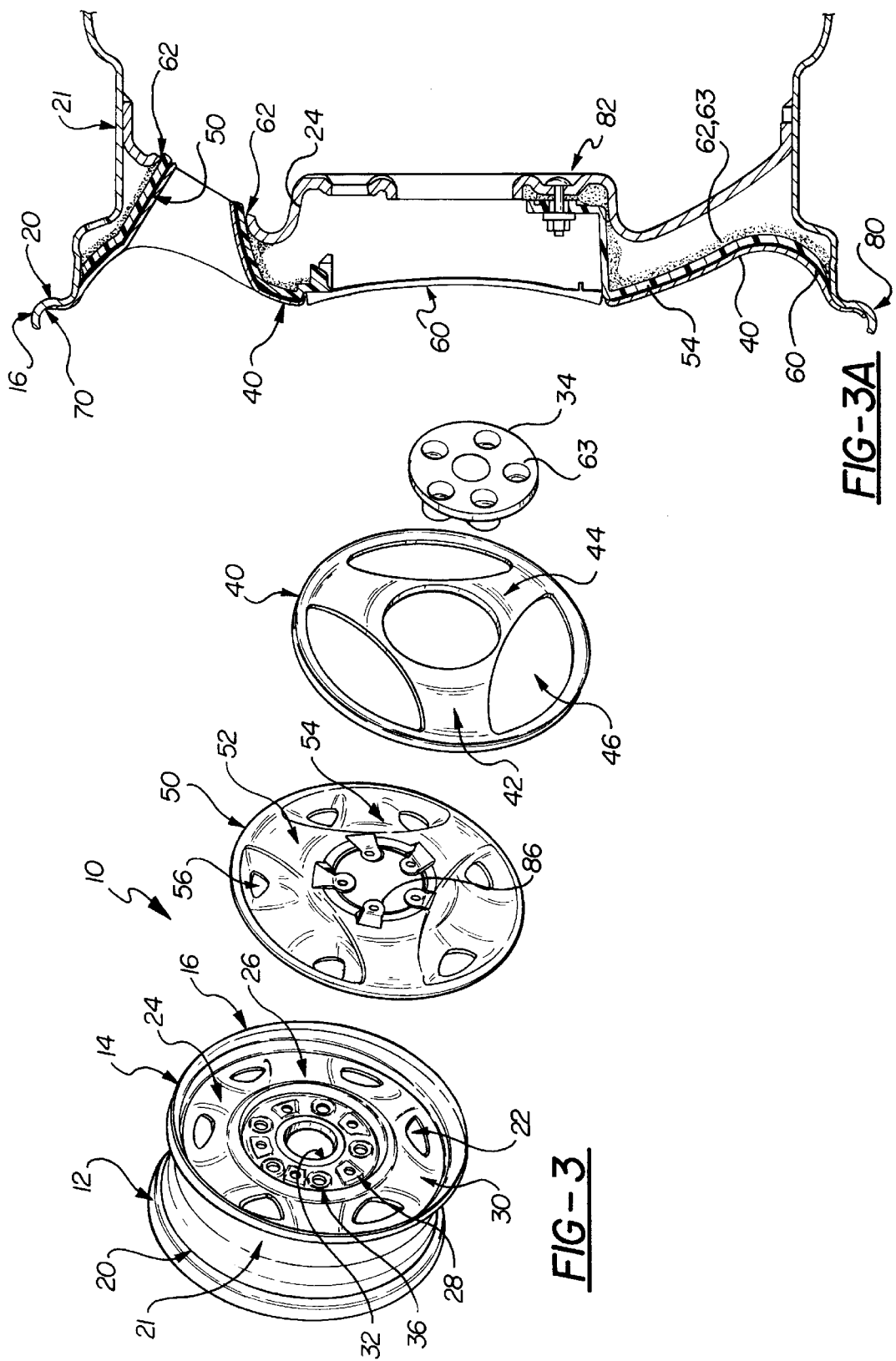

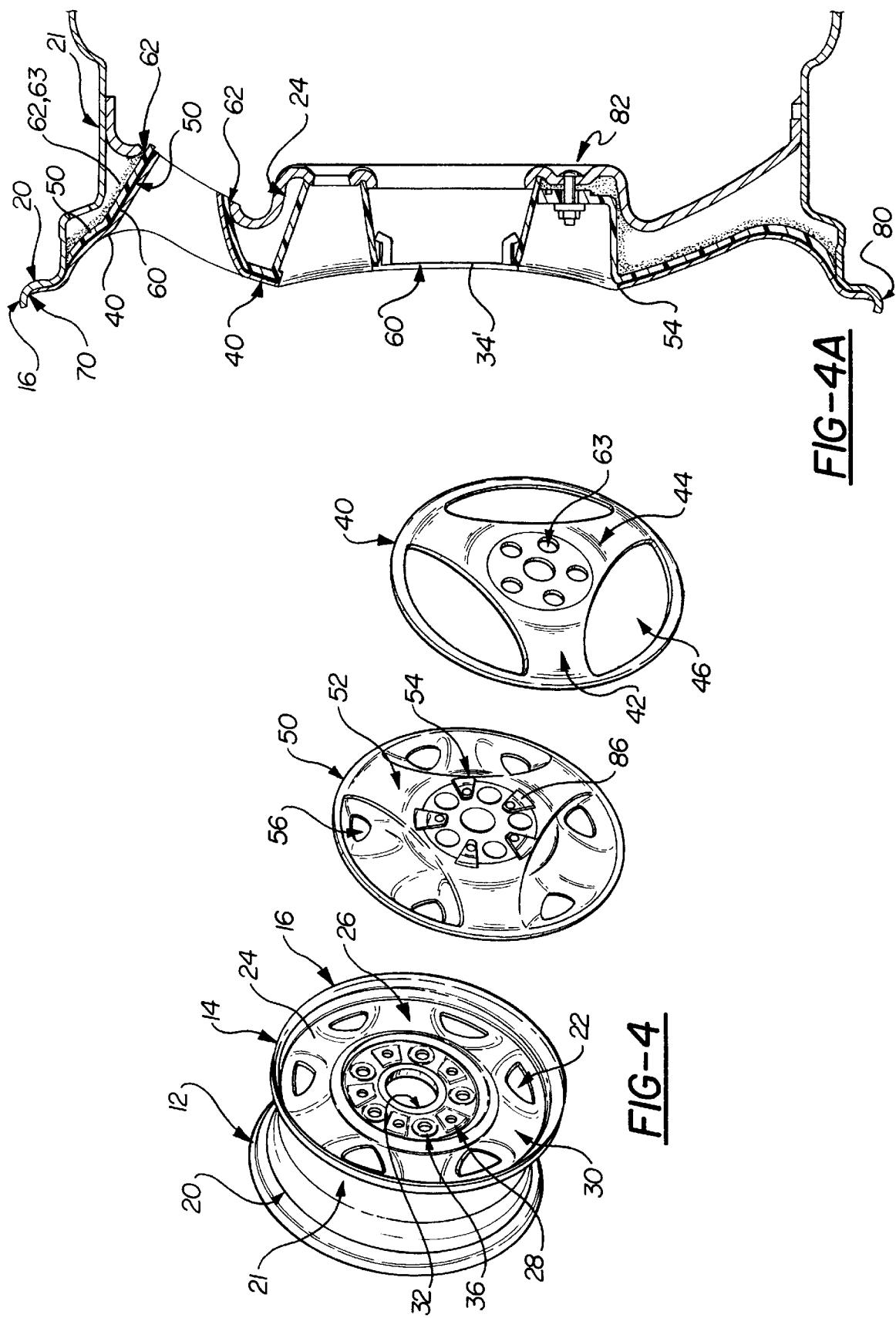

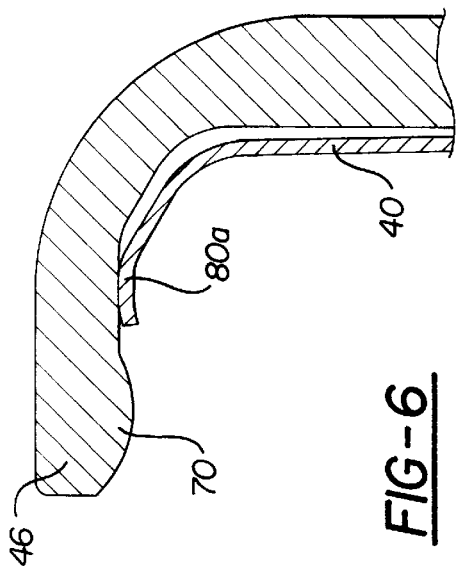
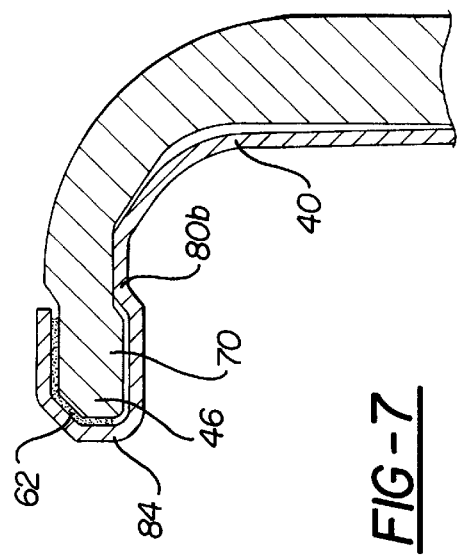
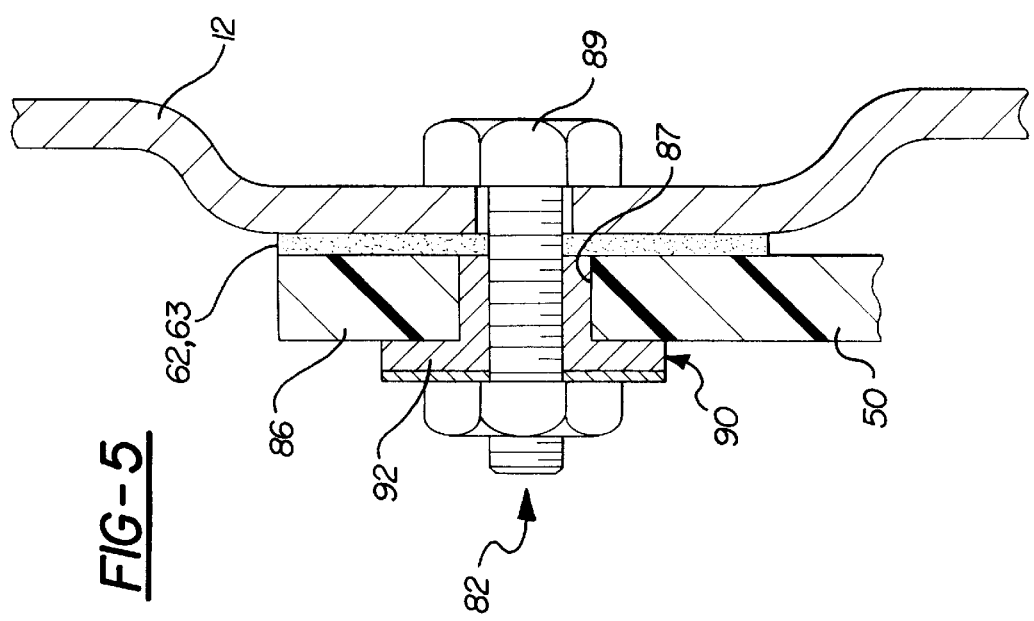

VEHICLE WHEEL ASSEMBLY AND METHOD OF MAKING SAME

BACKGROUND OF THE INVENTION

1. Field of the Invention

The present invention relates generally to a vehicle wheel assembly, and more particularly to an ornamental vehicle wheel assembly of composite construction to simulate styling features of aluminum alloy wheels.

2. Description of the Related Art

Typical vehicle wheels generally comprise an annular member having a rim with a pair of spaced rimmed flanges for engaging the bead of the tire. The spider is fixed within the rim. The spider typically includes a plurality of spokes with interposed openings for aesthetic purposes and for venting air to the brakes. The spider also includes a plurality of lug stud holes at the center thereof for receiving lug studs protruding from the rotating hub. Lug nuts are threaded on the lug studs for securely clamping the wheel and tire to the rotating hub.

Wheels have been designed aesthetically to enhance the outer face design of the basic steel wheel. Aluminum alloy wheels are desirable due to the finished appearance of the wheel surface and the variations in depth obtainable thereby. Furthermore, such finish may include chrome plating. However, aluminum alloy wheels cost significantly more than steel wheels, especially when chrome plated.

Various attempts have been made in the prior art to decorate or finish the wheel wall while avoiding the usual expense of chrome plating or use of cast aluminum wheels.

U.S. Pat. No. 5,368,370 issued Nov. 29, 1994 in the name of Beam, and assigned to the assignee of the subject invention, discloses a vehicle wheel construction wherein a metal applique is adhered to a wheel. The applique is chrome plated to simulate a conventional electroplate chrome wheel assembly.

U.S. Pat. No. 5,458,401 issued Oct. 17, 1995 in the name of Baccman discloses a vehicle wheel and applique which is bonded to the face of the wheel. The applique has any desired surface treatment, i.e., chrome plating, brushed metal, painted, or the like, and is permanently fixed to the vehicle wheel using a stratum for a core member. The stratum includes two acrylic adhesive layers on opposing sides thereof wherein the applique is permanently fixed to the stratum. In Baccman, foam is part of the adhesive. The other side of the stratum is to be secured to the vehicle wheel. The stratum is fabricated from an acrylic foam core. The foam is being used merely for adhesive, and heat resistance may be a problem. Furthermore, the foam as a thermoset plastic is difficult to obtain various shapes and contours, and structural reinforcement would be questioned.

U.S. Pat. No. 3,669,501 issued Jun. 13, 1972 in the name of Derleth is similar to the Baccman patent above, but uses a foam-in-place process while the cover or skin is clamped to the steel wheel. The cover may be chrome plated. The cover is vacuum formed with the foam. The vacuum forming allows limited shapes and contours to be formed. The foam acts as an adhesive which is merely a foam backed adhesive sheet, as is common in the art. The foam covers 100% of the surface area.

U.S. Pat. No. 5,128,085 issued Jul. 7, 1992 in the name of Post et al. discloses a composite style wheel including a metallic wheel, wheel disk, and rim extending thereabout. Rubber inserts extend about the wheel disk adjacent the rim. Plastic overlays are secured to the disk and spaced thereabout by the inserts.

It is desirable to provide a simple applique which may be varied in contour and appearance to simulate aluminum alloy wheels without significant added costs.

SUMMARY OF THE INVENTION

The invention is a composite wheel assembly for a vehicle having an ornamental surface treatment. The assembly comprises an annular rim defining a central axis and having a rim flange. A spider is concentrically fixed within the rim for connecting to a rotating hub. The spider is shaped in a spider contour and includes a plurality of spokes with spider openings therebetween. An ornamental applique of substantially uniform material thickness overlaps at least a portion of the rim and at least a portion of the spider. The applique has an annular outer portion disposed adjacent the rim flange. The applique also includes an annular inner portion and a plurality of vent openings aligned between the spokes of the spider and positioned between the inner and outer portions. Also included is a separately formed, structural insert member having an annular outer insert portion adjacent to the rim and an annular inner insert portion and a plurality of vent openings aligned between the spokes of the spider. The insert member is formed of a contour different from the spider contour and spaced from the spider at various distances along the insert member. A first curable adhesive is disposed between the applique and the insert, and a resilient filler is disposed between the insert member and the rim and the spider.

Also included is a method of making a composite wheel assembly for a vehicle. The method includes the steps of providing a wheel having an annular rim and spider concentric within the rim, separately forming a metal skin of substantially uniform thickness, finishing the metal skin to an outer decorative surface finish, separately molding a structural insert member, assembling the metal skin and insert member with adhesive, and assembling the insert member to the vehicle wheel.

BRIEF DESCRIPTION OF THE DRAWINGS

Advantages of the subject invention will be readily appreciated as the same becomes better understood by reference to the following detailed description when considered with the accompanying drawings wherein:

FIG. 3 is an exploded view of FIG. 1;

FIG. 3a is a cross-sectional view taken along lines 3—3 of FIG. 1;

FIG. 4 is an exploded view of and alternative embodiment of the hub cap of FIG. 1;

FIG. 4a is a cross-sectional view taken along lines 3—3 of FIG. 1;

FIG. 5 is a cross-sectional view of the center fasteners;

FIG. 6 is an enlarged view of a first embodiment of the locking shoulder; and

FIG. 7 is an enlarged view of a second embodiment of the locking shoulder.

DESCRIPTION OF THE PREFERRED EMBODIMENT(S)

Figure 1:
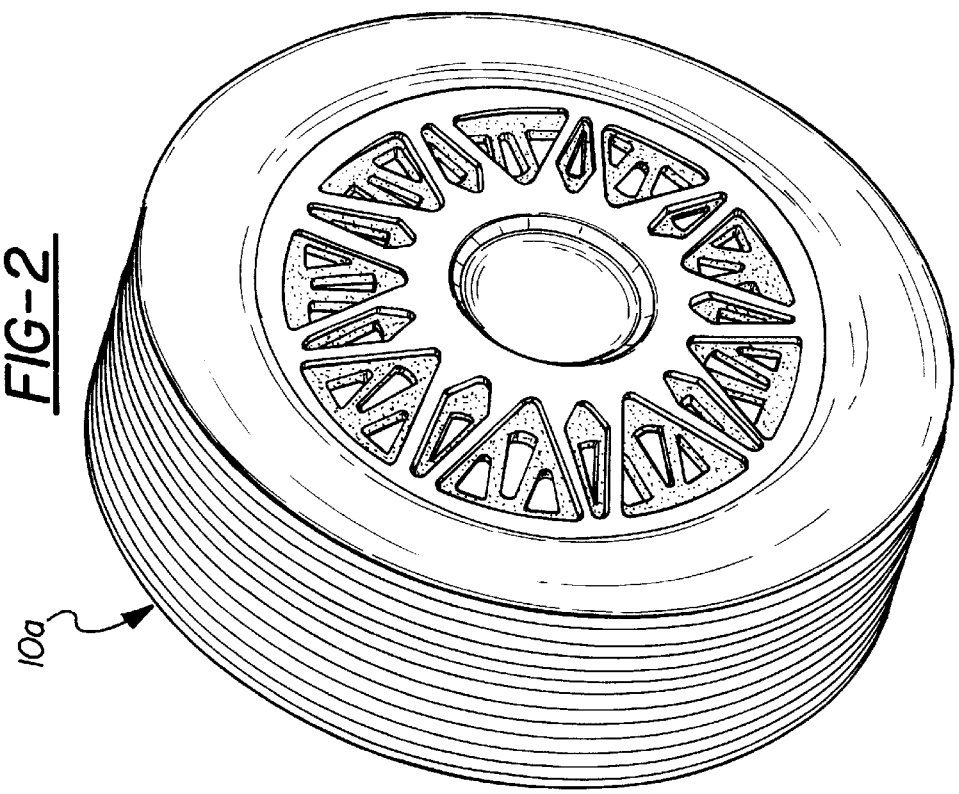
FIG. 1 is a perspective view of a first embodiment of the assembly.
Figure 2:
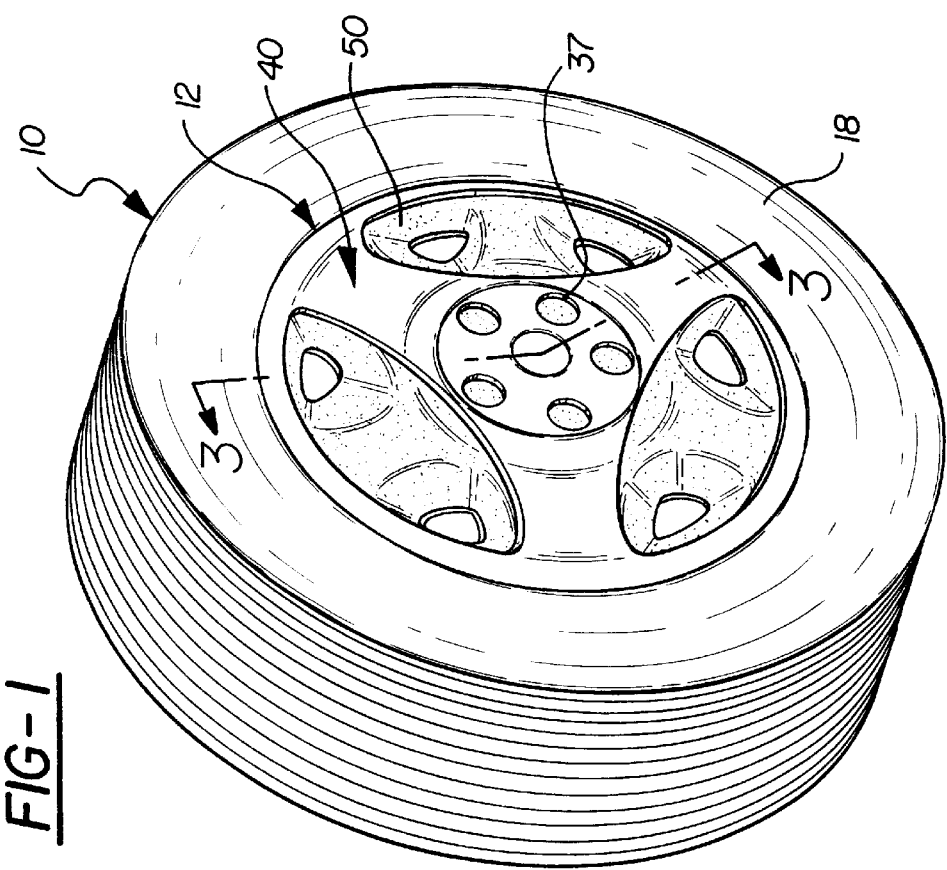
FIG. 2 is a perspective view of a second embodiment of the assembly.

A composite vehicle wheel 10,10A is generally shown in FIGS. 1 and 2. The assembly 10,10A has a permanent ornamental surface treatment, such as chrome plated steel. The assembly 10,10A, constructed in accordance with the invention, provides an appearance of an aluminum alloy wheel with chrome plating or other decorative surface finish. This provides a less expensive and more durable assembly 10,10A.

The invention will be described with reference to the first embodiment 10, though the teachings also apply to the second embodiment 10A. It should be appreciated that other styles or appearances may be used based on the teachings of the subject invention.

The assembly 10 includes a wheel 12 which includes an annular rim 14 defining a central axis A. The rim 14 includes a pair of spaced rim flanges 16 between which a standard tube-type or tubeless tire 18 is mounted. A bead seat radius 20 is interposed between each of the rim flanges 16 and a well portion 21 for retaining the tire beads.

The wheel 12 also includes a spider 24 concentrically fixed within the rim 14 for connecting to a rotating hub (not shown). The spider 24 includes a plurality of spokes 26 which radiate from a center section 28 to a spoke flange 30. Venting spaces 22 are interposed between adjacent spokes 26. The spoke flange 30 interconnects with the rim 14.

The center section 28 of the spider 24 includes a center hole 32 for receiving the protruding portion of the hub and its dust cap. As known in the art, various caps or covers are available for aesthetically trimming the center hole 32.

Disposed circumferentially about the center hole 32 are a plurality of lug stud holes 36. Standard threaded lug studs 37 extend from the hub and pass through the holes 36. The wheel assembly 10 includes five such lug stud holes. In typical fashion, lug nuts are threaded onto the studs to secure the wheel assembly 10 to the hub.

In common manufacturing practices, the rim 14 and spider 24 of the assembly 10 are manufactured from fabricated steel. However, other materials may be used, such as aluminum for reduced weight.

An ornamental applique 40 is formed of substantially uniform thickness material, such as sheet aluminum or stainless steel, though plastic may also be used. The applique 40 overlaps the rim 14 and spider 24 to present an ornamental surface treatment to the visible outer portions of the assembly 10. The applique 40 has an annular outer connecting portion 42 disposed adjacent the outer rim flange 16. The outer connecting portion 42 overlies the rim flange 16 and the spoke flange 30 of the spider 24. The applique 40 also includes an annular interconnecting portion 44 overlying at least a portion of the center section 28.

The applique 40 includes a plurality of vent openings 46 aligned between the spokes 26 of the spider 24. The vent openings 46 are radially positioned between the inner and outer connecting portions 42,44, and preferably the vent openings 46 correspond with open portion 22 between the spokes 26, though may be of different dimension or number, as subsequently discussed. The vent openings 46 may vary from the spoke 26 configuration so that different and unique ornamental designs can be achieved. In some cases, the number of the vent openings 46 need not be equal to the number of spokes 26. Thus, the rim 14 and the spider 24 configuration can be used with many vent openings 46 of the applique 40.

The applique 40 is fabricated from a substantially uniform thickness material, typically by a stamping operation. It will be readily appreciated that such a forming technique is quick, easy and relatively inexpensive. Also the durable sheet metal construction is ideal for plating with chrome, or other finishing such as paint, machine turning, brushing, or polishing. Use of stainless steel material provides an excellent bonding surface for the chrome, and will not corrode when portions of the chrome plating are chipped away. When a bright machine turned or polished metal look is desired, similar to the appearance or most alloy aluminum wheels, stamped aluminum material can be used for the applique as an alternative to the stainless steel. The stamped aluminum is decorated with the desired finish (machined or polished) then a protective coat of pain (typically powder coating) is applied to the applique. It should be appreciated that other materials, such as plastic, may also be used.

The applique 40 is generally thin providing minimal structural support, and therefore requires support over a substantial portion to be provided by either the wheel 12, as set forth in prior U.S. Pat. No. 5,368,370, or as subsequently described herein.

The assembly 10 includes an insert member 50 which allows the contour of the wheel 12 to be modified with use of the applique 40 thereover. The insert member 50 is generally formed of an injection molded thermoplastic material which is easy to mold into different shapes, is of a heavier material and denser material than in the prior art foam molding, and provides the structural rigidity required to support the applique 40 in a contour different from the wheel 12. The insert member 50 is formed to create depth in the assembly 10 to simulate an aluminum alloy wheel.

The insert member 50 has an annular outer insert portion 52 adjacent the rim 14 and an annular inner insert portion 54. A plurality of vent openings 56 are aligned between the spokes of the spider 24. The insert member 50 is formed of a contour different from the contour of the spider 24 and rim 14, and is spaced from the spider 24 and rim 14 at different and variable distances along the insert member 50. In this manner, the insert member 50 can create a vehicle wheel of generally flat or convex configuration, rather than concave which is the contour of the original wheel 12. In the preferred embodiment, the insert member 50 is of a uniform material thickness which is molded to the desired contour to provide support for the applique 40. More particularly, the insert member 50 is of a thermoplastic substrate, such as a blend of polyphenylene oxide and polyamide. Other materials may be utilized which provide similar characteristics of heat resistance and structural support and impact resistance, such as glass or mineral reinforced polyamide. Suitable materials have been found to be: General Electric—Noryl, G.T.X.810, Polyphenylene Ether/Polyamide (PA66+PPE); General Electric—Noryl, G.T.X.910, Polyphenylene Ether/Polyamide (PA66+PPE); Bayer—Durethan, BKV-15H, Polyamide (PA6), 15% Glass Reinforced; Bayer—Durethan, BKV-115H, Polyamide (PA6), 15% Glass Reinforced; DuPont —Minlon, 13MM Polyamide (PA66). The material is of suitable structural strength to support and maintain the formed contour.

As illustrated in FIGS. 1 and 3, the insert member 50 substantially covers the spider 24, and the applique 40 covers less than the entire spider 24 or less than the entire surface area of the insert member 50.

A first adhesive 60 is disposed between the insert member 50 and the applique 40. This adhesive 60 is of thin, uniform thickness, since the contour of the applique 40 closely complements the contour of the insert member 50.

The insert member 50 is fixedly secured to the spider 24 with a resilient filler 61 therebetween. The filler 61 may comprise a second curable adhesive 62, or alternatively, a gasket 63 may be clamped therebetween for sealing purposes. The second adhesive 62 is of variable thickness and fills in any cavities provided by the insert member 50 on the back side adjacent the spider 24. This provides a sealing affect to prevent water and debris from coming between the insert member 50 and the wheel 12. In the preferred embodiment, all overlapping areas between the insert member 50 and the wheel 12 are provided with the sealing adhesive 62. Preferably, the adhesives 60,62 are a structural epoxy, acrylic, or urethane material applied in a tacky uncured condition between the rim 14 and spider 24 along overlapping surface areas. The second adhesive 62 extends for an amount less than the surface area of the rim. However, when the locking shoulder 80b and flange 84 is used, as subsequently discussed, the adhesive 62 may also extend under the flange 84. The sealing may also be provided by a resilient gasket 63, such as foamed rubber or foamed urethane, and also covers substantially the area between the insert member 50 and wheel 12.

In the preferred embodiment, the applique 40 is also locked to the annular rim 14 to provide additional securing of the applique 40 and insert member 50 to the wheel 12. This locking may be accomplished by either or the combination of a locking shoulder 80a, b (FIGS. 6 and 7) and center locking member 82.

There are two embodiments of the locking shoulder 80a, b. In both embodiments, the annular rim 14 includes a lip 70 formed in the rim flange 16. The locking shoulder 80a, b of the outer connecting portion 42 of the applique engages the annular lip 70 to hold the applique and there also the insert member 50 in place. The locking shoulder 80a is formed by the end of the applique 40 curving slightly inwardly which portion snaps under the lip 70 as illustrated in FIG. 6. The locking shoulder 80b is formed by an annular recess or rib in the applique 40, but extends with a flange 84 about the top of the rim. This provides additional decorative overlay on the top of the rim. Preferably, the locking shoulder 80 is press forced into engagement behind the lip 70 so that spring like pressure is exerted against the wheel by the applique 40. This locking effectively holds the members 40,50 on the wheel while any adhesives 60,62 cure and during normal wheel use. The center locking members 82 are positioned between the lug stud holes 36. The locking members 82 include a locking tab 86 with an aperture 87 extending from the inner portion of the insert member 50 aligning with a locking hole 88 in the wheel which is located between adjacent lug stud holes 36. A locking fastener 89 is fed through the backside of the wheel (the opposing side from the insert member 50). The gasket 63 or adhesive 62 is also placed about the aperture 87. An insulator 90 is comprised of a flanged cylindrical member which fits within the insert aperture 87 and with its flat flanges 92 extending on the outer surface of the insert member between the nut of the fastener 89. Alternatively, the insulator 90 may be molded with threads and/or the fastener nut to allow ease in assembly.

The inner connecting portion 44 of the applique 40 extends radially inwardly as far as the lug stud holes 36 in a first center cover embodiment illustrated in FIG. 3. The inner connecting portion 44 extends over the lug stud holes 36, and corresponding apertures 63 are aligned over each of the lug stud holes 36 to permit passage of the studs (not shown). The specific configuration of the cap 34 determines the inward extent of the inner connecting portion 44. The cap portion may also be as set forth in U.S. Pat. No. 5,368,370, incorporated by reference herein. The cap 44, as illustrated, may be snap fit to the insert member 50 to cover the lug stud area and hub.

In an alternative embodiment illustrated in FIG. 4, the applique 40 and insert member 50 extend over the lug stud area but not the hub. A smaller cap 34' is snap fit only over the hub portion.

Depending on the aesthetic requirements of the wheel assembly 10, a portion of the insert member 50 may be exposed along with the applique 40. As illustrated in the Figures, the insert member 50 extends completely over the spider 24, and the applique 40 extends less than the entire area of the insert member 50 to create the depth in appearance and detailed design of contrasting finish. In this case, the insert member 50 may include a finished surface, such as painting, and the applique to will be chrome finished to create the cast aluminum effect.

The invention also includes a method of making the assembly 10. The method includes the steps of stamping or forming a sheet of metal material to form the applique or skin 40 of suitable contour and design. Thereafter, the applique 40 is surface finished, such as buffing and polishing, circular brush finish, or machined. A final finish is placed on the applique 40, such as a clear coat paint or chrome finish.

The method also includes injection molding the insert member 50 of thermoplastic material to have an outer contour supporting the contour of the applique 40. If the insert member 50 is to have a visible surface in the final assembly 10, the surface of the insert member 50 is painted with a base coat and clear coat paint.

The applique 40 and insert member 50 are assembled with a thin coating of the first adhesive 60 therebetween. The adhesive is oven cured to accelerated curing time (optional) to form the subassembly. The sub-assembly is applied to the steel wheel 12 with either the second adhesive 62 or gasket 63 therebetween and is mechanically locked to the wheel.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A composite wheel assembly for a vehicle having an ornamental surface treatment, said assembly comprising:

an annular rim defining a central axis and having a rim flange;

a spider concentrically fixed within said rim for connecting to a rotating hub, said spider shaped in a spider contour and including a plurality of spokes with openings therebetween;

an ornamental applique of substantially uniform material thickness overlapping at least a portion of said rim and said spider;

said applique having an annular outer portion disposed adjacent said rim flange, an annular inner portion, and plurality of vent openings aligned between said spokes of said spider and positioned between said inner and outer portions;

a separately formed and structural insert member having an annular outer insert portion adjacent said rim and an annular inner insert portion and a plurality of vent openings aligned between said spokes of said spider, said insert member formed of a contour different from said spider contour and spaced from said spider at various distances along said insert member;

a first curable adhesive of variable thickness disposed between said applique and said insert;

a resilient filler disposed between said insert member and said rim and said spider.

2. An assembly as set forth in claim 1 wherein said resilient filler extends for less than the surface area of said rim.

3. An assembly as set forth in claim 1 wherein said insert member is of uniform material thickness.

4. An assembly as set forth in claim 1 wherein said annular outer portion said applique extends outwardly of said insert member to said annular rim.

5. An assembly as set forth in claim 1 wherein said annular rim includes an annular lip, said annular outer portion engaging and locking with said lip to secure said applique and said insert member to said rim.

6. An assembly as set forth in claim 1 wherein said applique is of metal material.

7. An assembly as set forth in claim 1 wherein said insert member is injection molded of thermoplastic material.

8. An assembly as set froth in claim 4 wherein said insert member covers a greater portion of said spider than said applique.

9. An assembly as set forth in claim 1 wherein said annular inner insert portion includes apertures therein for receiving a fastener therethrough, said rim including holes so that said fastener secures said insert member to said wheel.

10. A method of making a composite wheel assembly for a vehicle, the method including the steps of:
   providing a wheel having an annular rim and spider concentric within the rim;
   separately forming a skin of substantially uniform thickness and providing a surface;
   finishing the skin to an outer decorative surface finish;
   separately molding an insert member having an exterior surface and of structural plastic material and extending over a substantial portion of the spider;
   assembling the skin and insert member with adhesive;
   assembling the insert member to the vehicle wheel such that the skin is substantially supported by the insert member or wheel over substantially the entire surface of the insert member.

11. A method as set forth in claim 10 further including forming said insert member to an insert contour different from said spider contour.

12. A method as set forth in claim 11 further including locking the skin underneath a lip of the annular rim to secure the skin and insert member to the rim.

13. A method as set forth in claim 10 further including finishing an exterior surface of the insert member prior to assembling with the metal skin which is visible and extends beyond the metal skin upon assembly.

14. A method as set forth in claim 10 further including curing the adhesives after each application.

15. A method as set forth in claim 10 further including locking the metal skin with the wheel rim.

16. A method as set forth in claim 15 further including attaching fasteners in the center of the metal skin through insert member to wheel.

17. A method as set forth in claim 10 wherein the forming of a skin comprises forming a metal skin.

18. A method as set forth in claim 10 wherein said insert member is an integral member extending over said spider.

19. A method as set forth in claim 10 further including applying a resilient filler between the insert member and the spider.

20. A composite wheel assembly for a vehicle having an ornamental surface treatment, said assembly comprising:
   an annular rim defining a central axis and having a rim flange;
   a spider concentrically fixed within said rim for connecting to a rotating hub, said spider shaped in a spider contour and including a plurality of spokes with openings therebetween;
   an ornamental applique of substantially uniform material thickness overlapping at least a portion of said rim and said spider;
   said applique having an annular outer portion disposed adjacent said rim flange, an annular inner portion, and plurality of vent openings aligned between said spokes of said spider and positioned between said inner and outer portions;
   a separately formed and structural insert member having an annular outer insert portion adjacent said rim and an annular inner insert portion and a plurality of vent openings aligned between said spokes of said spider, said insert member formed of a contour different from said spider contour and spaced from said spider at various distances along said insert member;
   a first curable adhesive of variable thickness disposed between said applique and said insert;
   a locking member locking one of said applique or said insert to said wheel.

21. A method of making a composite wheel assembly for a vehicle, the method including the steps of:
   providing a wheel having an annular rim and spider concentric within the rim;
   separately forming a skin of substantially uniform thickness;
   finishing the skin to an outer decorative surface finish;
   separately molding an insert member having an exterior surface and of structural plastic material and extending over a substantial portion of the spider;
   assembling the skin and insert member with adhesive;
   assembling the insert member to the vehicle wheel such that the skin is supported by the insert member or wheel;
   finishing an exterior surface of the insert member prior to assembling with the metal skin which is visible and extends beyond the metal skin upon assembly.

22. A composite wheel assembly for a vehicle having an ornamental surface treatment, said assembly comprising:
   an annular rim defining a central axis and having a rim flange;
   a spider concentrically fixed within said rim for connecting to a rotating hub, said spider shaped in a spider contour and including a plurality of spokes with openings therebetween;
   an ornamental applique of substantially uniform material thickness overlapping at least a portion of said spider;
   said applique having plurality of vent openings aligned between said spokes of said spider;
   a separately formed and structural insert member having a plurality of vent openings aligned between said spokes of said spider, said insert member formed of a contour different from said spider contour and spaced from said spider at various distances along said insert member, said insert member substantially covering said spider;
   a first curable adhesive of variable thickness disposed between said applique and said insert.

23. A method as set forth in claim 22 further including a locking member locking one of said applique or said insert member to said wheel.

24. A method as set forth in claim 22 further including a resilient filler disposed between said insert member and said spider.

* * * * *

UNITED STATES PATENT AND TRADEMARK OFFICE
CERTIFICATE OF CORRECTION

PATENT NO. : 5,820,225
DATED : October 13, 1998
INVENTOR(S) : David Ferriss, et al.

It is certified that error appears in the above-identified patent and that said Letters Patent is hereby corrected as shown below:

Column 4, line 6, please delete "or" and insert therefor --of--.

Column 4, line 10, please delete "pain" and insert therefor --paint--.

Column 5, line 38, please delete "and".

Column 5, line 64, please delete "4" and insert therefor --4A--.

Column 6, line 9, please delete "to" and insert therefor --40--.

Signed and Sealed this

Second Day of February, 1999

Attest:

Attesting Officer

*Acting Commissioner of Patents and Trademarks*